US012183236B2

(12) United States Patent
Qiao et al.

(10) Patent No.: US 12,183,236 B2
(45) Date of Patent: Dec. 31, 2024

(54) GATE DRIVING CIRCUIT INCLUDING FIRST VOLTAGE STABILIZING UNIT, DRIVING METHOD, AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventors: Zhenyang Qiao, Guangdong (CN); Liuqi Zhang, Guangdong (CN); Baixiang Han, Guangdong (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 18/148,782

(22) Filed: Dec. 30, 2022

(65) Prior Publication Data

US 2024/0135849 A1 Apr. 25, 2024
US 2024/0233593 A9 Jul. 11, 2024

(30) Foreign Application Priority Data

Oct. 25, 2022 (CN) ......................... 202211313899.3

(51) Int. Cl.
*G09G 3/20* (2006.01)

(52) U.S. Cl.
CPC ....... *G09G 3/20* (2013.01); *G09G 2300/0426* (2013.01); *G09G 2300/08* (2013.01); *G09G 2310/0267* (2013.01); *G09G 2310/0278* (2013.01); *G09G 2310/08* (2013.01)

(58) Field of Classification Search
CPC ............. G09G 3/20; G09G 2300/0426; G09G 2300/08; G09G 2310/0267; G09G 2310/08; G09G 2310/0278
See application file for complete search history.

(56) References Cited

U.S. PATENT DOCUMENTS

2019/0325836 A1* 10/2019 Qian .................... G09G 3/3677
2021/0118347 A1* 4/2021 Wang .................. G09G 3/3266

* cited by examiner

*Primary Examiner* — Adam J Snyder
(74) *Attorney, Agent, or Firm* — PV IP PC; Wei Te Chung

(57) ABSTRACT

The present application provides a gate driving circuit, a driving method, and a display panel. The gate driving circuit includes a pull-up control module, a pull-up module, a pull-down control module, a pull-down module, and a voltage stabilizing module. The pull-down node and the pull-up control module are connected to the voltage stabilizing module, which is not only reduce a leakage current of the pull-down node in the high potential state to stabilize the high potential of the pull-down node, but also maintain the level of the pull-down node in the low potential state to stabilize the low potential of the pull-down node.

18 Claims, 2 Drawing Sheets

GATE DRIVING CIRCUIT INCLUDING FIRST VOLTAGE STABILIZING UNIT, DRIVING METHOD, AND DISPLAY PANEL

FIELD OF INVENTION

The present application relates to a field of display technology, in particular, to a gate driving circuit, a driving method, and a display panel.

DESCRIPTION OF PRIOR ART

In a gate driving circuit, an output end of a pull-up control module is connected to a control end of a pull-up module to form a pull-up node, and an output end of a pull-down control module is connected to a control end of a pull-down module to form a pull-down node. Unstable potential of at least one of the pull-up node and the pull-down node will reduce the reliability of work.

SUMMARY

The present application provides a gate driving circuit, a driving method, and a display panel to alleviate a technical problem of poor potential stability of a pull-down node.

In a first aspect, the present application provides a gate driving circuit. The gate driving circuit includes a pull-up control module, a pull-up module, a pull-down control module, a pull-down module, and a voltage stabilizing module. The pull-up control module is connected to a pull-up node, and the pull-up control module is configured to control a potential of the pull-up node. The pull-up module is connected to the pull-up node, and the pull-up module is configured to output a driving signal according to the potential of the pull-up node. The pull-down control module is connected to a pull-down node and the pull-up control module, and the pull-down control module is configured to control a potential of the pull-down node. The pull-down module is connected to the pull-down node and the pull-up module, and the pull-down module is configured to output the driving signal according to the potential of the pull-down node. The voltage stabilizing module is connected to the pull-down node and the pull-up control module, and the voltage stabilizing module is configured to reduce a leakage current of the pull-down node in a high potential state and maintain a level of the pull-down node in a low potential state.

In some embodiments, the voltage stabilizing module includes a leakage control unit and a first voltage stabilizing unit;

the leakage control unit is connected to the pull-down node and configured to output a trigger signal to reduce the leakage current in response to the high potential state of the pull-down node; and the first voltage stabilizing unit is connected to the leakage control unit and the pull-down node, and the first voltage stabilizing unit is configured to reduce the leakage current of the pull-down node according to the trigger signal and to pull down the potential of the pull-down node in response to the high potential of the pull-up node and the low potential of the pull-down node.

In some embodiments, the leakage control unit includes a first transistor, one of source/drain electrodes of the first transistor is connected to a high potential line, a gate electrode of the first transistor is connected to the pull-down node, and another one of the source/drain electrodes of the first transistor is connected to a first node.

In some embodiments, the first voltage stabilizing unit includes a second transistor and a third transistor;

one of source/drain electrodes of the second transistor is connected to the pull-down node, another one of the source/drain electrodes of the second transistor is connected to the another one of the source/drain electrodes of the first transistor and the first node, and a gate electrode of the second transistor is connected to a first driving line; and one of the source/drain electrodes of the third transistor is connected to the another one of the source/drain electrodes of the second transistor, another one of the source/drain electrodes of the third transistor is connected to a first low potential line, and a gate electrode of the third transistor is connected to the first driving line.

In some embodiments, the voltage stabilizing module further includes a second voltage stabilizing unit, the second voltage stabilizing unit is connected to the pull-down node, the pull-up node, the first node, and the first low potential line, and the second voltage stabilizing unit is configured to reduce the leakage current of the pull-down node according to the trigger signal and to pull down the potential of the pull-down node in response to the high potential of the pull-up node and the low potential of the first node.

In some embodiments, the second voltage stabilizing unit includes a fourth transistor and a fifth transistor;

one of source/drain electrodes of the fourth transistor is connected to the pull-down node, another one of the source/drain electrodes of the fourth transistor is connected to the first node, and a gate electrode of the fourth transistor is connected to the pull-up node; and one of source/drain electrodes of the fifth transistor is connected to the another one of the source/drain electrodes of the fourth transistor, another one of the source/drain electrodes of the fifth transistor is connected to the first low potential line, and a gate electrode of the fifth transistor is connected to the gate electrode of the fourth transistor.

In some embodiments, the pull-up control module includes a sixth transistor and a seventh transistor;

one of source/drain electrodes of the sixth transistor is connected to the high potential line, and a gate electrode of the sixth transistor is connected to the first driving line; and one of source/drain electrodes of the seventh transistor is connected to another one of the source/drain electrodes of the sixth transistor, another one of the source/drain electrodes of the seventh transistor is connected to the pull-up node, and a gate electrode of the seventh transistor is connected to the gate electrode of the sixth transistor.

In some embodiments, the pull-up control module further includes an eighth transistor, a ninth transistor, a tenth transistor, a first capacitor, an eleventh transistor, and a twelfth transistor;

one of source/drain electrodes of the eighth transistor is connected to an input end of the pull-up module and the high potential line, and a gate electrode of the eighth transistor is connected to the pull-up node and a control end of the pull-up module;

one of source/drain electrodes of the ninth transistor is connected to the pull-up node, another one of the source/drain electrodes of the ninth transistor is connected to another one of the source/drain electrodes of the eighth transistor, and a gate electrode of the ninth transistor is connected to a second driving line;

one of source/drain electrodes of the tenth transistor is connected to the another one of the source/drain electrodes of the ninth transistor, another one of the source/drain electrodes of the tenth transistor is connected to the first low potential line, and a gate electrode of the tenth transistor is connected to the gate electrode of the ninth transistor;

an end of the first capacitor is connected to the pull-up node, and another end of the first capacitor is connected to an output end of the pull-up module and an output end of the pull-down module;

one of source/drain electrodes of the eleventh transistor is connected to the pull-up node, another one of the source/drain electrodes of the eleventh transistor is connected to the another one of the source/drain electrodes of the eighth transistor, and a gate electrode of the eleventh transistor is connected to the pull-down node; and one of source/drain electrodes of the twelfth transistor is connected to the another one of the source/drain electrodes of the eleventh transistor, another one of the source/drain electrodes of the twelfth transistor is connected to the first low potential line, and a gate electrode of the twelfth transistor is connected to the gate electrode of the eleventh transistor.

In some embodiments, the pull-down control module includes a thirteenth transistor, a second capacitor, and a fourteenth transistor;

one of source/drain electrodes of the thirteenth transistor is connected to the second driving line, and a gate electrode of the thirteenth transistor is connected to a stage transmission line;

one end of the second capacitor is connected to another one of the source/drain electrodes of the thirteenth transistor; and one of source/drain electrodes of the fourteenth transistor is connected to another end of the second capacitor and the high potential line, a gate electrode of the fourteenth transistor is connected to the another one of the source/drain electrodes of the thirteenth transistor, and another one of the source/drain electrodes of the fourteenth transistor is connected to the pull-down node and a control end of the pull-down module, and an input end of the pull-down module is connected to the first low potential line or a second low potential line.

In a second aspect, the present application provides a display panel, the display panel includes the gate driving circuit defined in at least one of the above embodiments.

In a third aspect, the present application provides driving method, the driving method is applied to the gate driving circuit defined in at least one of the above embodiments. The driving method includes: controlling a potential of a pull-up node according to a first driving signal by a pull-up control module; controlling a potential of a pull-down node according to a second driving signal and a stage transmission signal by a pull-down control module; reducing a leakage current of the pull-down node in a high potential state and maintaining a level of the pull-down node in a low potential state according to the first driving signal and the potential of the pull-up node by a voltage stabilizing module; pulling up and maintaining a potential of the driving signal according to the potential of the pull-up node by a pull-up module; and pulling down and maintaining the potential of the driving signal according to the potential of the pull-down node by a pull-down module.

In some embodiments, the driving method further includes: generating a rising edge of the first driving signal at a first time by a scanning control driver; and generating a first rising edge of the stage signal within a first time range by the scanning control driver, wherein the scanning control driver configures the first time falls within the first time range.

In some embodiments, the driving method further includes: generating a rising edge of the second driving signal at a second time by the scanning control driver, wherein the second time is later than the first time in a frame and falls outside the first time range; and generating a second rising edge of the stage signal at the second time by the scanning control driver.

In some embodiments, the driving method further includes: configuring the rising edge of the driving signal falls within the first time range by a gate driving circuit; and configuring a falling edge of the driving signal at the second time by the gate driving circuit.

The gate driving circuit, the driving method, and the display panel are provided in the present application. The pull-down node and the pull-up control module are connected to the voltage stabilizing module. This not only reduce a leakage current of the pull-down node in the high potential state to stabilize the high potential of the pull-down node, but also maintain the level of the pull-down node in the low potential state to stabilize the low potential of the pull-down node. Therefore, the potential stability of the pull-down node and the reliability of work are improved.

In addition, the voltage stabilizing module can play two different functions under corresponding conditions to realize multiple functions with less hardware. This simplifies a structure of the gate driving circuit and reduces a space occupied by a frame of the display panel.

BRIEF DESCRIPTION OF DRAWINGS

The technical solutions and other beneficial effects of the present application will be apparent through the detailed description of the specific embodiments of the present application below in combination with the accompanying drawings.

DETAILED DESCRIPTION OF EMBODIMENTS

The technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

Figure 1:
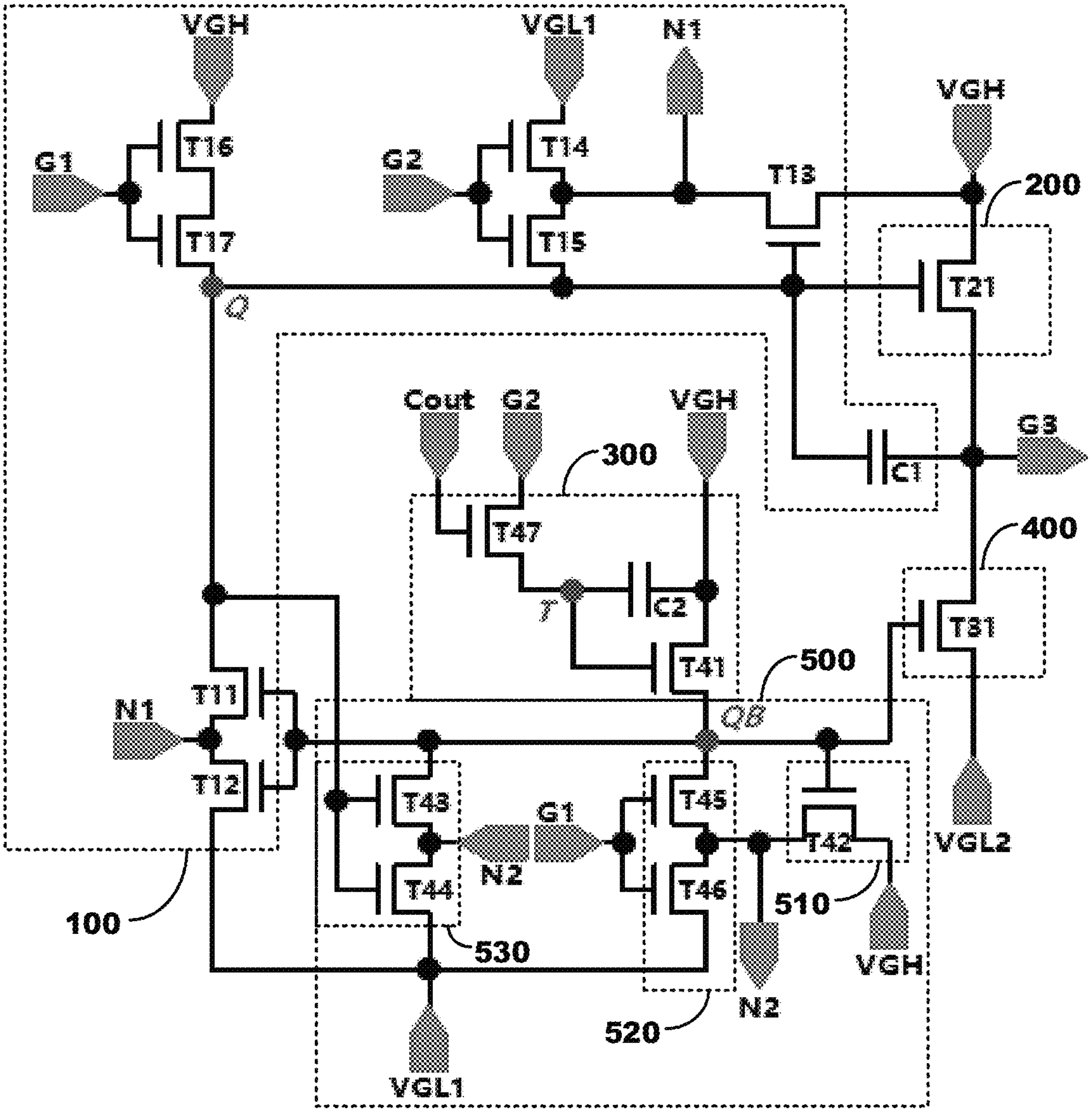
FIG. 1 is a schematic structural diagram of a gate driving circuit provided in embodiments of the present application.
Figure 2:
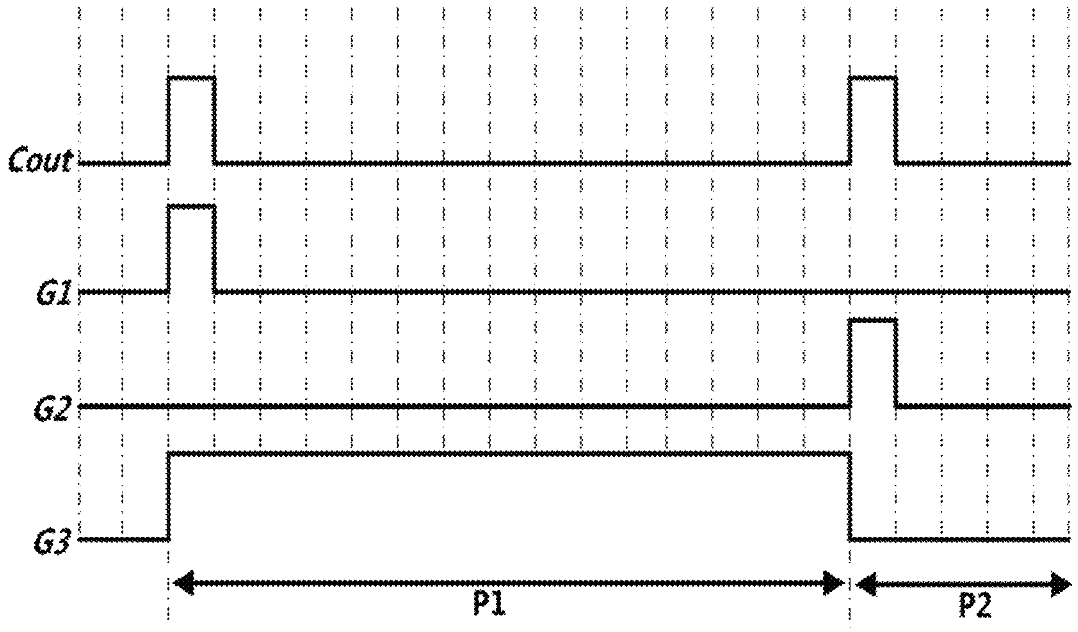
FIG. 2 is a schematic timing diagram of the gate driving circuit shown in FIG. 1.

This embodiment provides a gate driving circuit, please refer to FIG. 1 and FIG. 2. As shown in FIG. 1, the gate driving circuit includes a pull-up module 200. An input end of the pull-up module 200 is connected to a high potential line. A control end of the pull-up module 200 is connected to a pull-up node Q. An output end of the pull-up module 200 is configured to output a driving signal G3.

It should be noted that the high potential line is configured to transmit a high potential signal VGH. The pull-up module 200 can provide a high potential for the driving signal G3 according to a potential of the pull-up node Q.

In one of the embodiments, the pull-up module 200 includes a pull-up transistor T21. One of source/drain electrodes of the pull-up transistor T21 is connected to the high potential line. A gate electrode of the pull-up transistor T21 is connected to the pull-up node Q. another one of the source/drain electrodes of the pull-up transistor T21 is configured to output the driving signal G3.

It can be understood that the pull-up transistor T21 can provide the high potential for the driving signal G3 in an on-state or in an open state.

In one of the embodiments, the above-defined gate driving circuit further includes a pull-down module 400. An input end of the pull-down module 400 is connected to a first low potential line or a second low potential line. An output end of the pull-down module 400 is connected to the output end of the pull-up module 200 and is configured to output the driving signal G3. A control end of the pull-down module 400 is connected to a pull-down node QB.

It should be noted that the first low potential line is configured to transmit a first low potential signal VGL1. The second low potential line is configured to transmit a second low potential signal VGL2. The pull-down module 400 can be configured to provide the driving signal G3 according to a potential of the pull-down node QB.

In one of the embodiments, the pull-down module 400 includes a pull-down transistor T31. One of source/drain electrodes of the pull-down transistor T31 is connected to the first low potential line or the second low potential line. A gate electrode of the pull-down transistor T31 is connected to the pull-down node QB. another one of the source/drain electrodes of the pull-down transistor T31 is connected to the another one of the source/drain electrodes of the pull-up transistor T21 to output the driving signal G3.

It can be understood that the pull-down transistor T31 can provide a low potential for the driving signal G3 in the on-state or in the open state.

In one of the embodiments, the above-defined gate driving circuit further includes a voltage stabilizing module 500. The voltage stabilizing module 500 is connected to the pull-down node QB. The voltage stabilizing module 500 is configured to reduce a leakage current when the pull-down node QB is in a high potential state and maintain a level of the pull-down node in a low potential state.

It can be understood that in the gate driving circuit provided in the embodiment, the pull-down node QB is connected to the voltage stabilizing module 500, which not only reduce the leakage current of the pull-down node QB in the high potential state to stabilize the high potential of the pull-down node QB, but also maintain the level of the pull-down node QB in the low potential state to stabilize the low potential of the pull-down node QB. This improves the potential stability of the pull-down node QB and also improves the reliability of work.

In addition, the voltage stabilizing module 500 can play two different functions under corresponding conditions, can realize multiple functions with less hardware, simplifies the structure of the gate driving circuit, and also reduces the space occupied by the frame of the display panel.

In one of the embodiments, the voltage stabilizing module 500 includes a leakage control unit 510 and a first voltage stabilizing unit 520. The leakage control unit 510 is connected to the pull-down node QB and is configured to output a trigger signal to reduce the leakage current in response to the high potential state of the pull-down node QB. The first voltage stabilizing unit 520 is connected to the leakage control unit 510 and the pull-down node QB. The first voltage stabilizing unit 520 is configured to reduce the leakage current of the pull-down node QB according to the trigger signal, and to pull down the potential of the pull-down node QB in response to the high potential of the pull-up node Q and the low potential of the pull-down node QB.

It should be noted that an input end of the leakage control unit 510 can be connected to the high potential line, a control end of the leakage control unit 510 can be connected to the pull-down node QB, and an output end of the leakage control unit 510 can be connected to a first node N2. An input end of the first voltage stabilizing unit 520 is connected to the first low potential line, a first control end of the first voltage stabilizing unit 520 is connected to a second control end of the first voltage stabilizing unit 520 and the first driving line. The first stabilizing unit 520 is connected to the first driving line. An output end of the voltage stabilizing unit 520 is connected to the pull-down node QB. An internal node of the first voltage stabilizing unit 520 is connected to the first node N2. The first driving line is configured to transmit a first driving signal G1.

A combination of the first voltage stabilizing unit 520 and the leakage control unit 510 can reduce the leakage current when the pull-down node QB is at the high potential state, thereby stabilizing the high potential of the pull-down node QB. When the pull-down node QB is in the low potential state, the leakage control unit 510 does not work and the first voltage stabilizing unit 520 can work alone. At this time, under the control of the high potential of the first driving signal G1, the potential of the pull-up node Q is the same as the potential of the first driving signal G1. Therefore, the low potential of the pull-down node QB can be stabilized at the same potential as the first low potential signal VGL1.

The trigger signal may be the high potential signal VGH output by the leakage control unit 510.

In one of the embodiments, the leakage control unit 510 includes a first transistor T42. One of source/drain electrodes of the first transistor T42 is connected to the high potential line. A gate electrode of the first transistor T42 is connected to the pull-down node QB. Another one of the source/drain electrodes of the first transistor T42 is connected to the first node N2.

It should be noted that, when the first transistor T42 is in an on-state or an open state, the high potential signal VGH is transmitted to the first node N2 through the first transistor T42 as the above trigger signal.

In one of the embodiments, the first voltage stabilizing unit 520 includes a second transistor T45 and a third transistor T46. One of source/drain electrodes of the second transistor T45 is connected to the pull-down node QB. Another one of the source/drain electrodes of the second transistor T45 is connected to the another one of the source/drain electrodes of the first transistor T42 and the first node N2. A gate electrode of the second transistor T45 is connected to the first driving line. One of source/drain electrodes of the third transistor T46 is connected to the another one of the source/drain electrodes of the second transistor T45. Another one of the source/drain electrodes of the third transistor T46 is connected to the first low potential line. A gate electrode of the third transistor T46 is connected to the first driving line.

It should be noted that when the potential of the pull-down node QB is in a high potential state, the first driving signal G1 is in a low potential state, the second transistor T45 and the third transistor T46 are both turned off, and at this time a potential of the first node N2 is in a high potential state, the potential of the signal VGH is not lower than the potential of the pull-down node QB. Therefore, a leakage path of the charge of the pull-down node QB discharged through the second transistor T45 is slowed down or eliminated, so that the high potential state of pull-down node QB can last longer.

While the potential of the pull-down node QB is in a low potential state, the first driving signal G1 is in a high potential state, the second transistor T45 and the third transistor T46 are both turned on, and at this time the potential of the first node N2 is in a natural state and is not affected. The potential of the high potential signal VGH is clamped. Therefore, the second transistor T45 and the third transistor T46 form a conduction path, which can keep the low potential of the pull-down node QB at the potential of the first low potential signal VGL1.

In one of the embodiments, the voltage stabilizing module 500 further includes a second voltage stabilizing unit 530. The second voltage stabilizing unit 530 is connected to the pull-down node QB, the pull-up node Q, the first node N2, and the first low potential line. The second voltage stabilizing unit 500 is configured to reduce the leakage current of the pull-down node QB according to the trigger signal and to pull down the potential of the pull-down node QB in response to the high potential of the pull-up node Q and the low potential of the first node N2.

It should be noted that an input end of the second voltage stabilizing unit 530 is connected to the first low potential line. A first control end of the second voltage stabilizing unit 530 is connected to a second control end of the second voltage stabilizing unit 530 and the pull-up node Q. An output end of the second voltage stabilizing unit 530 is connected to the pull-down node QB.

In one of the embodiments, the second voltage stabilizing unit 530 includes a fourth transistor T43 and a fifth transistor T44. One of source/drain electrodes of the fourth transistor T43 is connected to the pull-down node QB. Another one of the source/drain electrodes of the fourth transistor T43 is connected to the first node N2. A gate electrode of the fourth transistor T43 is connected to the pull-up node Q. One of source/drain electrodes of the fifth transistor T44 is connected to the another one of the source/drain electrodes of the fourth transistor T43. Another one of the source/drain electrodes of the fifth transistor T44 is connected to the first low potential line. A gate electrode of the fifth transistor T44 is connected to the gate electrode of the fourth transistor T43.

It should be noted that when the potential of the pull-down node QB is in a high potential state, the first driving signal G1 is in a low potential state, the potential of the pull-up node Q is also in a low potential state, and both the fourth transistor T43 and the fifth transistor T44 are turned off. At this time, the potential of the first node N2 is the potential of the high potential signal VGH, which is not lower than the potential of the pull-down node QB. Therefore, a leakage path of the charge of the pull-down node QB discharged through the fourth transistor T43 is slowed down or eliminated, so that the high potential state of pull-down node QB can last longer.

While the potential of the pull-down node QB is in a low potential state, the first driving signal G1 is in a high potential state, and both the fourth transistor T43 and the fifth transistor T44 are turned on. At this time, the potential of the first node N2 is in a natural state and is not affected. The potential of the high potential signal VGH is clamped. Therefore, the fourth transistor T43 and the fifth transistor T44 form a conduction path, which can keep the low potential of the pull-down node QB at the potential of the first low potential signal VGL1.

In one of the embodiments, the gate driving circuit further includes a pull-up control module 100 connected to the pull-up node Q. The pull-up control module is configured to control the potential of the pull-up node Q.

In one of the embodiments, the pull-up control module 100 includes a sixth transistor T16 and a seventh transistor T17. One of source/drain electrodes of the sixth transistor T16 is connected to the high potential line. A gate electrode of the sixth transistor T16 is connected to the first driving line. One of source/drain electrodes of the seventh transistor T17 is connected to another one of the source/drain electrodes of the sixth transistor T16. Another one of the source/drain electrodes of the seventh transistor T17 is connected to the pull-up node Q. A gate electrode of the seventh transistor T17 is connected to the gate electrode of the sixth transistor T16.

It should be noted that when the first driving signal G1 is at a high potential, the sixth transistor T16 and the seventh transistor T17 are turned on at a same time, and the potential of the pull-up node Q is also at a high potential.

The gate electrode of the sixth transistor T16 can share the first driving line with the gate electrode of the seventh transistor T17, the gate electrode of the second transistor T45, and the gate electrode of the third transistor T46. This can reduce a quantity of signal lines required by the gate driving circuit and is conducive to further reducing the border space.

In one of the embodiments, the pull-up control module 100 further includes an eighth transistor T13, a ninth transistor T15, a tenth transistor T14, a first capacitor C1, an eleventh transistor T11, and a twelfth transistor T12. One of source/drain electrodes of the eighth transistor T13 is connected to the input end of the pull-up module 200 and the high potential line. A gate electrode of the eighth transistor T13 is connected to the pull-up node Q and the control end of the pull-up module 200. One of source/drain electrodes of the ninth transistor T15 is connected to the pull-up node Q. Another one of the source/drain electrodes of the ninth transistor T15 is connected to another one of the source/drain of the eighth transistor T13. A gate electrode of the ninth transistor T15 is connected to the second driving line. One of source/drain electrodes of the tenth transistor T14 is connected to the another one of the source/drain electrodes of the ninth transistor T15. Another one of the source/drain electrodes of the tenth transistor T14 is connected to the first low potential line. A gate electrode of the tenth transistor T14 is connected to the gate electrode of the ninth transistor T15. An end of the first capacitor C1 is connected to the pull-up node Q. Another end of the first capacitor C1 is connected to the output end of the pull-up module 200 and the output end of the pull-down module 400. One of source/drain electrodes of the eleventh transistor T11 is connected to the pull-up node Q. Another one of the source/drain electrodes of the eleventh transistor T11 is connected to the another one of the source/drain electrodes of the eighth transistor T13. A gate electrode of the eleventh transistor T11 is connected to the pull-down node QB. One of source/drain electrodes of the twelfth transistor T12 is connected to the another one of the source/drain electrodes of the eleventh transistor T11. Another one of the source/drain electrodes of the twelfth transistor T12 is connected to the first low potential line. A gate electrode of the twelfth transistor T12 is connected to the gate electrode of the eleventh transistor T11.

The another one of the source/drain electrodes of the eighth transistor T13 can serve as the second node N1.

It should be noted that the another one of the source/drain electrodes of the tenth transistor T14, the another one of the source/drain electrodes of the fifth transistor T44, the another one of the source/drain electrodes of the twelfth transistor T12, and the another one of the source/drain electrodes of the third transistor T46 can share the first low potential line. This can reduce the quantity of the signal lines required by the gate driving circuit and is conducive to further reducing the border space.

In one embodiment, the gate driving circuit further includes a pull-down control module 300. The pull-down control module 300 is connected to the pull-down node QB and the pull-up control module 100. The pull-down control module 300 is configured to control the potential of the pull-down node QB.

In one of the embodiments, the pull-down control module 300 includes a thirteenth transistor T47, a second capacitor C2, and a fourteenth transistor T41. One of source/drain electrodes of the thirteenth transistor T47 is connected to the second driving line. A gate electrode of the thirteenth transistor T47 is connected to a stage transmission line. An end of the second capacitor C2 is connected to another one of the source/drain electrodes of the thirteenth transistor T47. One of source/drain electrodes of the fourteenth transistor T41 is connected to another end of the second capacitor C2 and the high potential line. A gate electrode of the fourteenth transistor T41 is connected to the another one of the source/drain electrodes of the thirteenth transistor T47. Another one of the source/drain electrodes of the fourteenth transistor T41 is connected to the pull-down node QB and the control end of the pull-down module 400. The input end of the pull-down module 400 is connected to the first low potential line or the second low potential line connect.

The stage transmission line is configured to transmit a stage transmission signal Cout. The another one of the source/drain electrodes of the thirteenth transistor T47 may serve as a node T.

It should be noted that the one of the source/drain electrodes of the thirteenth transistor T47 can share the second driving line with the gate electrode of the ninth transistor T15 and the gate electrode of the tenth transistor T14, which can reduce the quantity of the signal lines required by the gate driving circuit and is conducive to further reducing the border space.

When the input end of the pull-down module 400 is connected to the second low potential line, the potential of the driving signal G3 can be pulled down separately, and the potential of the pull-up node Q and the potential of the pull-down node QB can be pulled down for potential isolation to avoid influence each other, and also improve the working reliability of the gate driving circuit.

It should be noted that at least one of the above-defined transistors can be an N-channel thin-film transistor, specifically an N-channel indium gallium zinc oxide thin-film transistor. At least one of the above-defined transistors can also be a P-channel thin-film transistor, specifically a P-channel low temperature polysilicon thin-film transistor.

FIG. 2 is a schematic timing diagram of the gate driving circuit shown in FIG. 1. Each of the above-defined transistors is an N-channel thin-film transistor, and a working cycle or a frame of the gate driving circuit includes the following two stages:

Wide pulse output stage P1: when the stage transmission signal Cout and the first driving signal G1 are switched to a high level, the sixth transistor T16 and the seventh transistor T17 are turned on, and the pull-up node Q is charged to a high level. Then the pull-up transistor T21, the second transistor T45, and the third transistor T46 are turned on. At a same time, the second driving signal G2 is at a low level, and the thirteenth transistor T47 in the on-state discharges the gate electrode of the fourteenth transistor T41 to a low level, and the pull-down node QB is fully discharged to a low level through the second transistor T45 and the third transistor T46. The pull-down transistor T31 is turned off, and the driving signal G3 is configured to start to output a high level.

Reset & idle phase P2: when the stage transmission signal Cout and the second drive signal G2 are switched to a high level, the ninth transistor T15 and the tenth transistor T14 are turned on, and the pull-up node Q is discharged to a low level. Then the pull-up transistor T21, the second transistor T45, and the third transistor T46 are turned off. At a same time, the second driving signal G2 is at a high level, and the thirteenth transistor T47 in the on-state charges the gate electrode of the fourteenth transistor T41 to a high level, and the pull-down node QB is charged to a high level through the fourteenth transistor T41. The pull-down transistor T31 is turned on, the driving signal G3 is configured to output a low level, the reset is completed, and the idle stage is entered.

It should be noted that the voltage stabilizing module 500 can reduce the leakage current when the pull-down node QB is in the high potential state and keep the pull-down node QB in the low potential state. In the reset & idle phase P2, the high potential state of the pull-down node QB is easier to maintain, so that at a beginning of the wide pulse output phase P1, a rising edge of the first driving signal G1 does not need to be strictly aligned with a first rising edge of the transmission signal Cout. That is, the first rising edge of the transmission signal Cout can move forward and backward relative to the rising edge of the first driving signal G1, that is, to change the phase. This can modulate the rising edge of the driving signal G3 by adjusting the rising edge of the first drive signal G1, without taking the first rising edge of the transmission signal Cout into consideration, which increases the phase adjustability and the adjustable range of the pulse width of the driving signal G3.

Based on the timing schematic diagram shown in FIG. 2, this embodiment provides a driving method, which is applied to the gate driving circuit in at least one embodiment above. The driving method includes: controlling a potential of a pull-up node according to a first driving signal by a pull-up control module; controlling a potential of a pull-down node according to a second driving signal and a stage transmission signal by a pull-down control module; reducing a leakage current of the pull-down node in a high potential state and maintaining a level of the pull-down node in a low potential state according to the first driving signal and the potential of the pull-up node by a voltage stabilizing module; pulling up and maintaining a potential of the driving signal according to the potential of the pull-up node by a pull-up module; and pulling down and maintaining the potential of the driving signal according to the potential of the pull-down node by a pull-down module.

It can be understood that in the driving method provided in this embodiment, the voltage stabilizing module 500 is connected to the pull-down node QB and the pull-up control module 100. This not only reduce the leakage current of the pull-down node QB in the high potential state to stabilize the high potential of the pull-down node QB, but also maintain the level of the pull-down node QB in the low potential state to stabilize the low potential of the pull-down node QB, which improves the potential stability of the pull-down node QB and also improves the reliability of work.

In addition, the voltage stabilizing module 500 can play two different functions under corresponding conditions, can realize multiple functions with less hardware, simplifies the structure of the gate driving circuit, and also reduces the space occupied by the frame of the display panel.

In one of the embodiments, the driving method further includes: generating a rising edge of the first driving signal at a first time by a scanning control driver. And generating a first rising edge of the stage signal within a first time range by the scanning control driver. The scanning control driver configures the first time falls within the first time range.

In one of the embodiments, the driving method further includes: generating a rising edge of the second driving signal at a second time by the scanning control driver, wherein the second time is later than the first time in a frame and falls outside the first time range. And generating a second rising edge of the stage signal at the second time by the scanning control driver.

In one of the embodiments, the driving method further includes: configuring the rising edge of the driving signal falls within the first time range by a gate driving circuit. And configuring a falling edge of the driving signal at the second time by the gate driving circuit.

It should be noted that, in this embodiment, in a frame, the gate driving circuit is configured to construct the rising edge of the driving signal according to the rising edge of the first driving signal and the first rising edge of the transmission signal. And the gate driving circuit is configured to construct the falling edge of the driving signal according to the rising edge of the second driving signal and the second rising edge of the transmission signal.

In one embodiment, as shown in FIG. 1 and FIG. 2, this embodiment provides a display panel, and the display panel includes the gate driving circuit in at least one embodiment above. The driving signal G3 is configured to turn on or turn off the thin-film transistor.

It can be understood that, in the display panel provided in this embodiment is, the voltage stabilizing module 500 is connected to the pull-down node QB and the pull-up control module 100. This not only reduce the leakage current of the pull-down node QB in the high potential state to stabilize the high potential of the pull-down node QB, but also maintain the level of the pull-down node QB in the low potential state to stabilize the low potential of the pull-down node QB. This improves the potential stability of the pull-down node QB and also improves the reliability of work.

In addition, the voltage stabilizing module 500 can play two different functions under corresponding conditions, can realize multiple functions with less hardware, simplifies the structure of the gate driving circuit, and also reduces the space occupied by the frame of the display panel.

It should be noted that the above high potential can turn on the N-channel thin-film transistor, or can turn off the P-channel thin-film transistor. The low potential defined above can turn on the P-channel thin-film transistor, or can turn off the N-channel thin-film transistor.

In one embodiment, the first driving signal G1, the second driving signal G2, and the stage transmission signal Cout defined above may all be provided or generated by a scan control driver.

It can be understood that this can reduce the quantity of scan control drivers used in the display panel and reduce the space occupied by the frame of the display panel.

In the foregoing embodiments, the descriptions of each embodiment have their own emphases, and for parts not described in detail in a certain embodiment, reference may be made to relevant descriptions of other embodiments.

The gate driving circuit, the drive method, and the display panel provided in the embodiments of the present application are described above in detail. In this paper, specific examples are used to illustrate the principles and implementation methods of the present application. The descriptions of the above embodiments are only used to help understand the technical solutions and core ideas of the present application. Those of ordinary skill in the art should understand that: they can still modify the technical solutions described in the foregoing embodiments, or perform equivalent replacements for some of the technical features. However, these modifications or replacements do not make the essence of the corresponding technical solutions depart from the scope of the technical solutions of the embodiments of the present application.

What is claimed is:

1. A gate driving circuit comprising:

a pull-up control module, wherein the pull-up control module is connected to a pull-up node, and the pull-up control module is configured to control a potential of the pull-up node;

a pull-up module, wherein the pull-up module is connected to the pull-up node, and the pull-up module is configured to output a driving signal according to the potential of the pull-up node;

a pull-down control module, wherein the pull-down control module is connected to a pull-down node and the pull-up control module, and the pull-down control module is configured to control a potential of the pull-down node;

a pull-down module, wherein the pull-down module is connected to the pull-down node and the pull-up module, and the pull-down module is configured to output the driving signal according to the potential of the pull-down node; and a voltage stabilizing module, wherein the voltage stabilizing module is connected to the pull-down node and the pull-up control module, and the voltage stabilizing module is configured to reduce a leakage current of the pull-down node in a high potential state and maintain a level of the pull-down node in a low potential state;

wherein the voltage stabilizing module comprises:

a leakage control unit connected to the pull-down node and configured to output a trigger signal to reduce the leakage current in response to the high potential state of the pull-down node; and a first voltage stabilizing unit connected to the leakage control unit and the pull-down node, and configured to reduce the leakage current of the pull-down node according to the trigger signal and to pull down the potential of the pull-down node in response to the high potential of the pull-up node and the low potential of the pull-down node; and wherein the first voltage stabilizing unit comprises a first transistor and a second transistor;

one of source/drain electrodes of the first transistor is directly connected to the pull-down node, another one of the source/drain electrodes of the first transistor is connected to the leakage control unit, and a gate electrode of the first transistor is directly connected to a first driving line; and one of the source/drain electrodes of the second transistor is connected to the another one of the source/drain electrodes of the first transistor, another one of the source/drain electrodes of the second transistor is connected to a first low potential line, and a gate electrode of the second transistor is directly connected to the first driving line.

2. The gate driving circuit according to claim 1, wherein the leakage control unit comprises a third transistor, one of source/drain electrodes of the third transistor is connected to a high potential line, a gate electrode of the third transistor is connected to the pull-down node, and another one of the source/drain electrodes of the third transistor is connected to a first node and the another one of the source/drain electrodes of the first transistor.

3. The gate driving circuit according to claim 2, wherein the voltage stabilizing module further comprises a second voltage stabilizing unit, the second voltage stabilizing unit is connected to the pull-down node, the pull-up node, the first node, and the first low potential line, and the second voltage stabilizing unit is configured to reduce the leakage current of the pull-down node according to the trigger signal and to pull down the potential of the pull-down node in response to the high potential of the pull-up node and the low potential of the first node.

4. The gate driving circuit according to claim 3, wherein the second voltage stabilizing unit comprises a fourth transistor and a fifth transistor;

one of source/drain electrodes of the fourth transistor is connected to the pull-down node, another one of the source/drain electrodes of the fourth transistor is connected to the first node, and a gate electrode of the fourth transistor is connected to the pull-up node; and one of source/drain electrodes of the fifth transistor is connected to the another one of the source/drain electrodes of the fourth transistor, another one of the source/drain electrodes of the fifth transistor is connected to the first low potential line, and a gate electrode of the fifth transistor is connected to the gate electrode of the fourth transistor.

5. The gate driving circuit according to claim 2, wherein the pull-up control module comprises a sixth transistor and a seventh transistor;

one of source/drain electrodes of the sixth transistor is connected to the high potential line, and a gate electrode of the sixth transistor is connected to the first driving line; and one of source/drain electrodes of the seventh transistor is connected to another one of the source/drain electrodes of the sixth transistor, another one of the source/drain electrodes of the seventh transistor is connected to the pull-up node, and a gate electrode of the seventh transistor is connected to the gate electrode of the sixth transistor.

6. The gate driving circuit according to claim 5, wherein the pull-up control module further comprises an eighth transistor, a ninth transistor, a tenth transistor, a first capacitor, an eleventh transistor, and a twelfth transistor;

one of source/drain electrodes of the eighth transistor is connected to an input end of the pull-up module and the high potential line, and a gate electrode of the eighth transistor is connected to the pull-up node and a control end of the pull-up module;

one of source/drain electrodes of the ninth transistor is connected to the pull-up node, another one of the source/drain electrodes of the ninth transistor is connected to another one of the source/drain electrodes of the eighth transistor, and a gate electrode of the ninth transistor is connected to a second driving line;

one of source/drain electrodes of the tenth transistor is connected to the another one of the source/drain electrodes of the ninth transistor, another one of the source/drain electrodes of the tenth transistor is connected to the first low potential line, and a gate electrode of the tenth transistor is connected to the gate electrode of the ninth transistor;

an end of the first capacitor is connected to the pull-up node, and another end of the first capacitor is connected to an output end of the pull-up module and an output end of the pull-down module;

one of source/drain electrodes of the eleventh transistor is connected to the pull-up node, another one of the source/drain electrodes of the eleventh transistor is connected to the another one of the source/drain electrodes of the eighth transistor, and a gate electrode of the eleventh transistor is connected to the pull-down node; and one of source/drain electrodes of the twelfth transistor is connected to the another one of the source/drain electrodes of the eleventh transistor, another one of the source/drain electrodes of the twelfth transistor is connected to the first low potential line, and a gate electrode of the twelfth transistor is connected to the gate electrode of the eleventh transistor.

7. The gate driving circuit according to claim 6, wherein the pull-down control module comprises a thirteenth transistor, a second capacitor, and a fourteenth transistor;

one of source/drain electrodes of the thirteenth transistor is connected to the second driving line, and a gate electrode of the thirteenth transistor is connected to a stage transmission line;

one end of the second capacitor is connected to another one of the source/drain electrodes of the thirteenth transistor; and one of source/drain electrodes of the fourteenth transistor is connected to another end of the second capacitor and the high potential line, a gate electrode of the fourteenth transistor is connected to the another one of the source/drain electrodes of the thirteenth transistor, and another one of the source/drain electrodes of the fourteenth transistor is connected to the pull-down node and a control end of the pull-down module, and an input end of the pull-down module is connected to the first low potential line or a second low potential line.

8. A display panel, comprising a gate driving circuit, wherein the gate driving circuit comprises:

a pull-up control module, wherein the pull-up control module is connected to a pull-up node, and the pull-up control module is configured to control a potential of the pull-up node;

a pull-up module, wherein the pull-up module is connected to the pull-up node, and the pull-up module is configured to output a driving signal according to the potential of the pull-up node;

a pull-down control module, wherein the pull-down control module is connected to a pull-down node and the pull-up control module, and the pull-down control module is configured to control a potential of the pull-down node;

a pull-down module, wherein the pull-down module is connected to the pull-down node and the pull-up module, and the pull-down module is configured to output the driving signal according to the potential of the pull-down node; and a voltage stabilizing module, wherein the voltage stabilizing module is connected to the pull-down node and the pull-up control module, and the voltage stabilizing module is configured to reduce a leakage current of the pull-down node in a high potential state and maintain a level of the pull-down node in a low potential state;

wherein the voltage stabilizing module comprises:

a leakage control unit connected to the pull-down node and configured to output a trigger signal to reduce the leakage current in response to the high potential state of the pull-down node; and a first voltage stabilizing unit connected to the leakage control unit and the pull-down node, and configured to reduce the leakage current of the pull-down node according to the trigger signal and to pull down the potential of the pull-down node in response to the high potential of the pull-up node and the low potential of the pull-down node; and wherein the first voltage stabilizing unit comprises a first transistor and a second transistor;

one of source/drain electrodes of the first transistor is directly connected to the pull-down node, another one of the source/drain electrodes of the first transistor is connected to the leakage control unit, and a gate electrode of the first transistor is directly connected to a first driving line; and one of the source/drain electrodes of the second transistor is connected to the another one of the source/drain electrodes of the first transistor, another one of the source/drain electrodes of the second transistor is connected to a first low potential line, and a gate electrode of the second transistor is directly connected to the first driving line.

9. The display panel according to claim 8, wherein the leakage control unit comprises a third transistor, one of source/drain electrodes of the third transistor is connected to a high potential line, a gate electrode of the third transistor is connected to the pull-down node, and another one of the source/drain electrodes of the third transistor is connected to a first node and the another one of the source/drain electrodes of the first transistor.

10. The display panel according to claim 9, wherein the voltage stabilizing module further comprises a second voltage stabilizing unit, the second voltage stabilizing unit is connected to the pull-down node, the pull-up node, the first node, and the first low potential line, and the second voltage stabilizing unit is configured to reduce the leakage current of the pull-down node according to the trigger signal and to pull down the potential of the pull-down node in response to the high potential of the pull-up node and the low potential of the first node.

11. The display panel according to claim 10, wherein the second voltage stabilizing unit comprises a fourth transistor and a fifth transistor;

one of source/drain electrodes of the fourth transistor is connected to the pull-down node, another one of the source/drain electrodes of the fourth transistor is connected to the first node, and a gate electrode of the fourth transistor is connected to the pull-up node; and one of source/drain electrodes of the fifth transistor is connected to the another one of the source/drain electrodes of the fourth transistor, another one of the source/drain electrodes of the fifth transistor is connected to the first low potential line, and a gate electrode of the fifth transistor is connected to the gate electrode of the fourth transistor.

12. The display panel according to claim 9, wherein the pull-up control module comprises a sixth transistor and a seventh transistor;

one of source/drain electrodes of the sixth transistor is connected to the high potential line, and a gate electrode of the sixth transistor is connected to the first driving line; and one of source/drain electrodes of the seventh transistor is connected to another one of the source/drain electrodes of the sixth transistor, another one of the source/drain electrodes of the seventh transistor is connected to the pull-up node, and a gate electrode of the seventh transistor is connected to the gate electrode of the sixth transistor.

13. The display panel according to claim 12, wherein the pull-up control module further comprises an eighth transistor, a ninth transistor, a tenth transistor, a first capacitor, an eleventh transistor, and a twelfth transistor;

one of source/drain electrodes of the eighth transistor is connected to an input end of the pull-up module and the high potential line, and a gate electrode of the eighth transistor is connected to the pull-up node and a control end of the pull-up module;

one of source/drain electrodes of the ninth transistor is connected to the pull-up node, another one of the source/drain electrodes of the ninth transistor is connected to another one of the source/drain electrodes of the eighth transistor, and a gate electrode of the ninth transistor is connected to a second driving line;

one of source/drain electrodes of the tenth transistor is connected to the another one of the source/drain electrodes of the ninth transistor, another one of the source/drain electrodes of the tenth transistor is connected to the first low potential line, and a gate electrode of the tenth transistor is connected to the gate electrode of the ninth transistor;

an end of the first capacitor is connected to the pull-up node, and another end of the first capacitor is connected to an output end of the pull-up module and an output end of the pull-down module;

one of source/drain electrodes of the eleventh transistor is connected to the pull-up node, another one of the source/drain electrodes of the eleventh transistor is connected to the another one of the source/drain electrodes of the eighth transistor, and a gate electrode of the eleventh transistor is connected to the pull-down node; and one of source/drain electrodes of the twelfth transistor is connected to the another one of the source/drain electrodes of the eleventh transistor, another one of the source/drain electrodes of the twelfth transistor is connected to the first low potential line, and a gate electrode of the twelfth transistor is connected to the gate electrode of the eleventh transistor.

14. The display panel according to claim 13, wherein the pull-down control module comprises a thirteenth transistor, a second capacitor, and a fourteenth transistor;

one of source/drain electrodes of the thirteenth transistor is connected to the second driving line, and a gate electrode of the thirteenth transistor is connected to a stage transmission line;

one end of the second capacitor is connected to another one of the source/drain electrodes of the thirteenth transistor, and one of source/drain electrodes of the fourteenth transistor is connected to another end of the second capacitor and the high potential line, a gate electrode of the fourteenth transistor is connected to the another one of the source/drain electrodes of the thirteenth transistor, and another one of the source/drain electrodes of the fourteenth transistor is connected to the pull-down node and a control end of the pull-down module, and an input end of the pull-down module is connected to the first low potential line or a second low potential line.

15. A driving method, wherein the driving method comprises:

controlling a potential of a pull-up node according to a first driving signal by a pull-up control module;

controlling a potential of a pull-down node according to a second driving signal and a stage transmission signal by a pull-down control module;

reducing a leakage current of the pull-down node in a high potential state and maintaining a level of the pull-down node in a low potential state according to the first driving signal and the potential of the pull-up node by a voltage stabilizing module, wherein the voltage stabilizing module comprises a leakage control unit and a first voltage stabilizing unit, the leakage control unit is connected to the pull-down node and is configured to output a trigger signal to reduce the leakage current in response to the high potential state of the pull-down node, and the first voltage stabilizing unit is connected to the leakage control unit and the pull-down node and is configured to reduce the leakage current of the pull-down node according to the trigger signal and to pull down the potential of the pull-down node in response to the high potential of the pull-up node and the low potential of the pull-down node; and wherein the first voltage stabilizing unit comprises a first transistor and a second transistor, one of source/drain electrodes of the first transistor is directly connected to the pull-down node, another one of the source/drain electrodes of the first transistor is connected to the leakage control unit, a gate electrode of the first transistor is directly connected to a first driving line, one of the source/drain electrodes of the second transistor is connected to the another one of the source/drain electrodes of the first transistor, another one of the source/drain electrodes of the second transistor is connected to a first low potential line, and a gate electrode of the second transistor is directly connected to the first driving line;

pulling up and maintaining a potential of the driving signal according to the potential of the pull-up node by a pull-up module; and pulling down and maintaining the potential of the driving signal according to the potential of the pull-down node by a pull-down module.

16. The driving method according to claim 15, wherein the driving method further comprises:

generating a rising edge of the first driving signal at a first time by a scanning control driver; and generating a first rising edge of the stage signal within a first time range by the scanning control driver, wherein the scanning control driver configures the first time falls within the first time range.

17. The driving method according to claim 16, wherein the driving method further comprises:

generating a rising edge of the second driving signal at a second time by the scanning control driver, wherein the second time is later than the first time in a frame and falls outside the first time range; and generating a second rising edge of the stage signal at the second time by the scanning control driver.

18. The driving method according to claim 17, wherein the driving method further comprises:

configuring the rising edge of the driving signal falls within the first time range by a gate driving circuit; and configuring a falling edge of the driving signal at the second time by the gate driving circuit.

* * * * *